United States Patent
Longdill et al.

(10) Patent No.: US 7,234,982 B2
(45) Date of Patent: Jun. 26, 2007

(54) AMPHIBIOUS VEHICLE SUSPENSION

(75) Inventors: Simon James Longdill, Auckland (NZ); Hans Weekers, Auckland (NZ); Stephen John Briggs, Auckland (NZ)

(73) Assignee: Gibbs Technologies Ltd, Warwickshire (GB)

( * ) Notice: Subject to any disclaimer, the term of this patent is extended or adjusted under 35 U.S.C. 154(b) by 0 days.

(21) Appl. No.: 11/256,205

(22) Filed: Oct. 21, 2005

(65) Prior Publication Data
US 2006/0183384 A1    Aug. 17, 2006

(30) Foreign Application Priority Data
Dec. 22, 2004    (GB) ................... 0423463.9

(51) Int. Cl.
*B60F 3/00*    (2006.01)
(52) U.S. Cl. .................... 440/12.5; 280/43.17
(58) Field of Classification Search ........... 440/12.5; 280/43, 43.17, 43.23
See application file for complete search history.

(56) References Cited

U.S. PATENT DOCUMENTS

| | | | |
|---|---|---|---|
| 2,350,037 A | 5/1944 | Hofheims et al. | |
| 2,397,791 A | 4/1946 | Kramer et al. | |
| 3,280,785 A | 10/1966 | Mycroft | |
| 4,958,584 A | 9/1990 | Williamson et al. | |
| 5,531,179 A | 7/1996 | Roycroft et al. | |
| 5,562,066 A | 10/1996 | Gere et al. | |
| 5,570,653 A * | 11/1996 | Gere et al. | 440/12.51 |
| 5,575,352 A | 11/1996 | Suzuki et al. | |
| 5,590,617 A * | 1/1997 | Gere et al. | 440/12.51 |
| 5,755,173 A | 5/1998 | Rorabaugh | |
| 2003/0176119 A1* | 9/2003 | Royle | 440/12.54 |
| 2004/0112661 A1* | 6/2004 | Royle | 180/209 |

FOREIGN PATENT DOCUMENTS

| | | |
|---|---|---|
| GB | 2394699 A | 5/2004 |
| GB | 2397344 A | 7/2004 |
| WO | WO 01/74612 A1 | 10/2001 |
| WO | WO 2004/039614 A1 | 5/2004 |
| WO | WO 2004/103743 A1 | 12/2004 |

* cited by examiner

*Primary Examiner*—Stephen Avila
(74) *Attorney, Agent, or Firm*—Fulwider Patton LLP

(57) ABSTRACT

A retractable suspension for an amphibious vehicle, the configuration of which allows the size of an opening in the hull necessary for accommodating the protraction of each wheel to be kept to a minimum. The suspension is configured such that the only component that comes to extend beyond the hull upon protraction is a generally tube shaped lower link that is pivotally attached to the hull at it is inboard end, that pivotally supports a hub carrier at its outboard end and that may simultaneously accommodate a drive shaft therein. The weight of the vehicle is supported by a spring arrangement bearing on the inboard end of the lower link.

51 Claims, 7 Drawing Sheets

AMPHIBIOUS VEHICLE SUSPENSION

CROSS-REFERENCES TO RELATED APPLICATIONS

This application claims priority from Great Britain Application Serial No. 0423463.9, filed Oct. 22, 2004.

BACKGROUND OF THE INVENTION

The present invention relates to vehicle suspension for driven axles of amphibious vehicles.

In an amphibious vehicle, it is desirable to reduce drag when in marine mode, particularly drag caused by disconformities in those parts of the vehicle in contact with the water. Some such vehicles have retracting wheels with recesses above the water-line for the wheels to retract into. In the case of a planing amphibious vehicle, the hull recesses are generally above the water-line when the vehicle is on the plane; or in the case of our co-pending application no. WO 04/103743A1, plates are fitted to the vehicle's bottom to cover as much as possible of the recesses for the rear driven wheels. Such plates are fixed after assembly of the vehicle suspension during manufacture. Nevertheless, tramping caused by hitting waves or wakes; or alternatively cornering; can cause the wheel recesses to catch the water, which may in turn slow or slew the vehicle. To minimize such effects, it is essential to minimize the length of such recesses in the longitudinal direction of the vehicle.

The use of upper and lower wishbone suspension has the advantage of bracing the suspension against torque input and vibration. It is also convenient to locate spring and damper units within the wheel retraction recesses; but as can be seen from WO 04/103743A1, both of these measures lead to large recesses in the vehicle hull.

Where an amphibious vehicle is based on passenger car conventions of vehicle packaging, seating across the vehicle will be provided, and wheel arches will be blended into the vehicle bodywork. However, if alternative packaging concepts from lighter and more compact vehicles are considered, different opportunities and challenges arise. Where seating is arranged longitudinally along the vehicle, it can be made narrower than a passenger car. Particularly where the power train is also aligned along the vehicle, a greater hull vee angle can be considered than for a passenger car type body with transverse seating and engine. The large vee angle offers agile marine handling, but requires the use of large diameter road wheels to give adequate ground clearance; which would suggest large wheel arches and bulky suspension.

Should these large wheel arches be integrated into the vehicle body styling, they would tend to negate the compactness and light weight of a narrow amphibious vehicle. This is emphasised with a large hull vee angle, as the wheels must be retracted through large angles to stay above the water-line when the vehicle is canted on water. However, if the wheel arches are allowed to protrude beyond the contours of the rest of the vehicle bodywork, the main structure of the vehicle can still be narrow and light in weight. Hence, a new incentive is found to provide a compact yet sturdy amphibious vehicle retractable suspension which requires minimal hull recesses. Similarly, if seating is provided substantially above the vehicle power train, rather than in front of the power train or behind it, the hull will be relatively short; so it becomes critically important to minimize interruptions to the planing surface.

SUMMARY OF THE INVENTION

One object of the present invention is therefore to provide a retractable suspension for an amphibious vehicle, in which each hull recess, at least for the lower support member of the suspension, is significantly shorter in the longitudinal direction of the vehicle than each hull recess in known retractable suspension vehicles. It is particularly suitable for use with driven wheels.

According to the present invention, there is provided an amphibious vehicle having a prime mover, seating arrangements, at least two road wheels and a hull, wherein two road wheels are each arranged to be driven from the prime mover at least by means of a primary shaft and an intermediate shaft between each wheel and each primary shaft, each intermediate shaft having an articulatable torque transmitting joint at each end so as to enable each driven wheel to be moved upwards from a lowered, ground engaging position to a raised position above the vehicle's water-line, wherein each said driven wheel is mounted rotatably to an intermediate suspension member, the intermediate suspension member being mounted to and between an upper suspension member and a lower suspension member, the lower suspension member being accommodated within a narrow recess or slot in the hull of the vehicle when its driven wheel is in the raised position, and wherein the intermediate shaft is encaged by a cage means mounted between the intermediate suspension member and the hull of the vehicle so as to resist torsional forces on the intermediate suspension member when the wheels are rotating or being braked.

For the avoidance of doubt, an articulatable torque transmitting joint in a shaft comprises an output member and an input member which may pivot relative to each other, not necessarily in the direction of rotation of the shaft, but along the axis of the shaft; and which joint is capable of transmitting torque when said members are angled relative to each other; and includes universal joints.

Preferably, the cage means is a tube surrounding at least mainly the intermediate shaft. The cage means may comprise the lower suspension member. The width of the recess in the hull may be less in the longitudinal direction of the vehicle than the radius of the driven wheel. The hull may be configured for planing; while the upper suspension member is preferably a wishbone mounted pivotably to the body of the vehicle. Although a wishbone conventionally comprises two converging arms, the arms may be substantially parallel to each other. Alternatively, the upper suspension member may comprise a McPherson strut.

The torque transmitting joints may be universal couplings; which may in turn comprise constant velocity (CV) joints. Such CV joints may be arranged with a fixed inner joint and a plunging outer joint, as described in our co-pending patent application WO 04/039614A1, the contents of which are incorporated herein by means of reference. Where a large hull vee angle is used, it may be necessary to rotate the road wheels as they are retracted, as shown in the figures, to ensure that the wheels remain clear of water when cornering. For example, an axis of rotation of a retractable road wheel which is substantially horizontal when the wheels are protracted and resting on level ground may be rotated at least thirty degrees from the horizontal when the wheels are retracted; preferably forty degrees.

To reduce the bulk of the suspension recesses in the hull, the spring and damper units for each road wheel may be mounted remotely from the upper and lower suspension members; preferably within a watertight interior compartment of the vehicle. The road wheel suspension retraction and protraction means may similarly be mounted remotely from the wheel suspension. Clearly both spring and damper units and retraction and protraction means must be mechanically linked to the upper and lower suspension members. The retraction and protraction means may be linked to a pivotal arm, to either end of which are mounted springs and dampers. The cage means may be sealed against ingress of water.

The passenger seating may be arranged along, or parallel to, the longitudinal axis of the vehicle. The prime mover may also be arranged along, or parallel to, the longitudinal axis of the vehicle.

These and other features and advantages of the present invention will become apparent from the following detailed description of preferred embodiments which, taken in conjunction with the accompanying drawings, illustrate by way of example the principles of the invention.

DETAILED DESCRIPTION OF THE PREFERRED EMBODIMENTS

Figure 1:
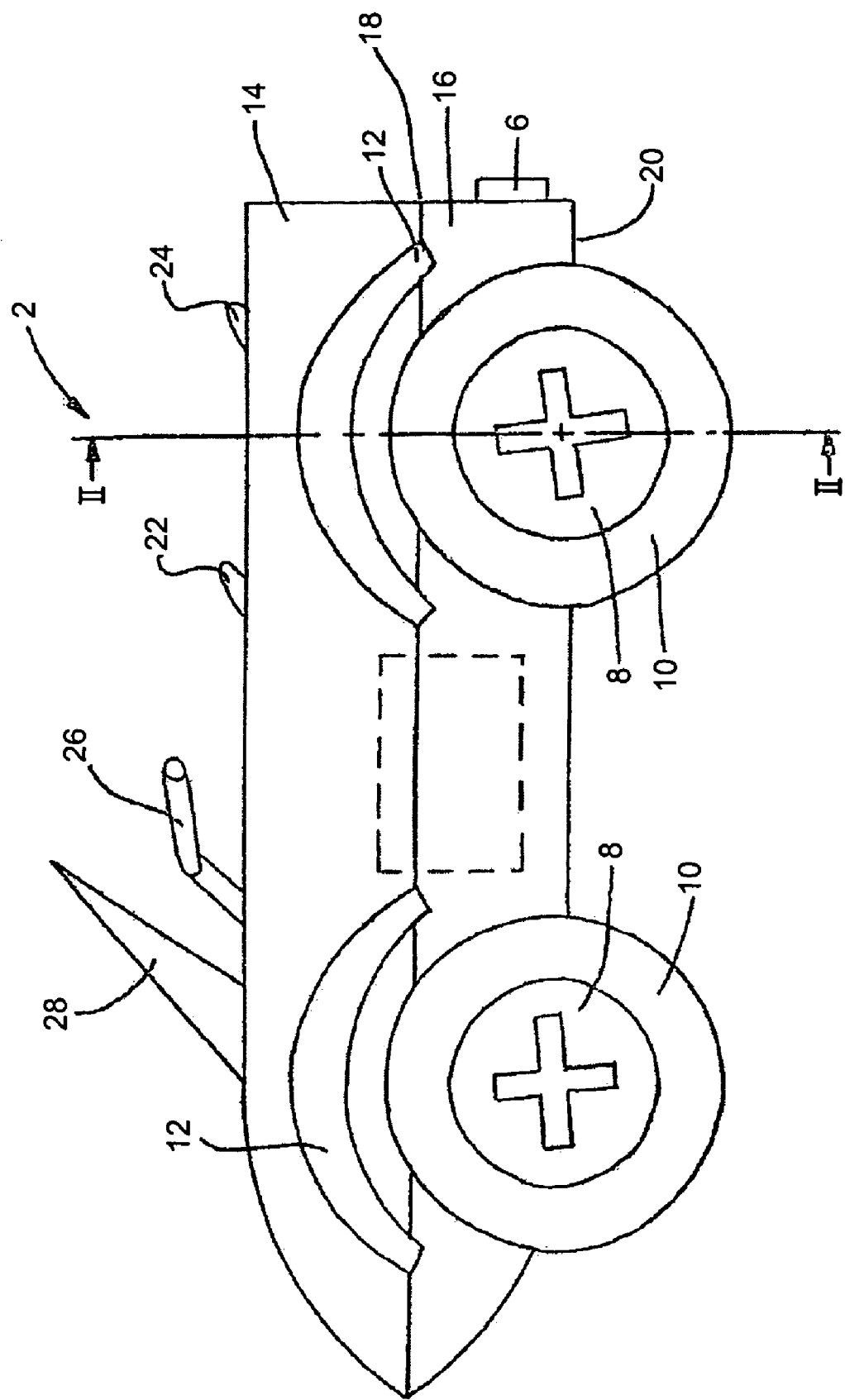
FIG. 1 is a side elevation view of an amphibious vehicle according to the invention.

Amphibious vehicle 2 comprises prime mover 4 driving marine drive means 6 through a marine transmission (not shown). Drive means 6 may be a jet. Locomotion on road is provided by wheels 8 and tyres 10, which are driven through a road transmission (not shown). The wheels and tyres are shielded by wheel arches 12. Body 14 and hull 16 may be formed separately and joined at split line 18. The hull may have a planing surface 20. At least a driver's seat 22 is provided; one or more passenger seats 24 may be provided astern of the driver's seat. The seating axis may be on the longitudinal axis of the vehicle, or parallel thereto. The axis of the prime mover may also be along, or parallel to, the longitudinal axis of the vehicle. Driver controls are provided, such as handlebars 26. A windscreen 28 may be provided for weather and spray protection. Spray management features (not shown) may also be built into the hull, along with a keel and strake(s).

Figure 2:
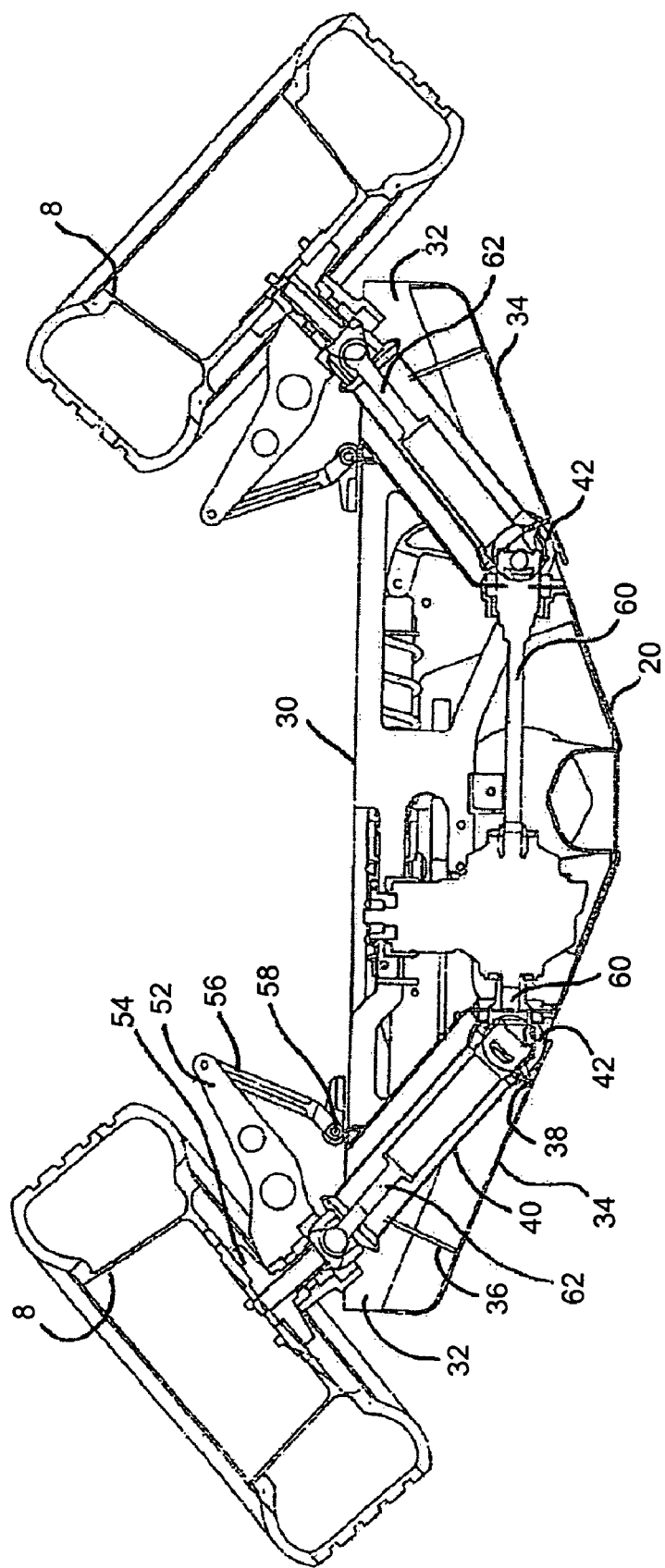
FIG. 2 is a partial transverse cross section through plane II—II of FIG. 1 with the wheels up and retracted.
Figure 3:
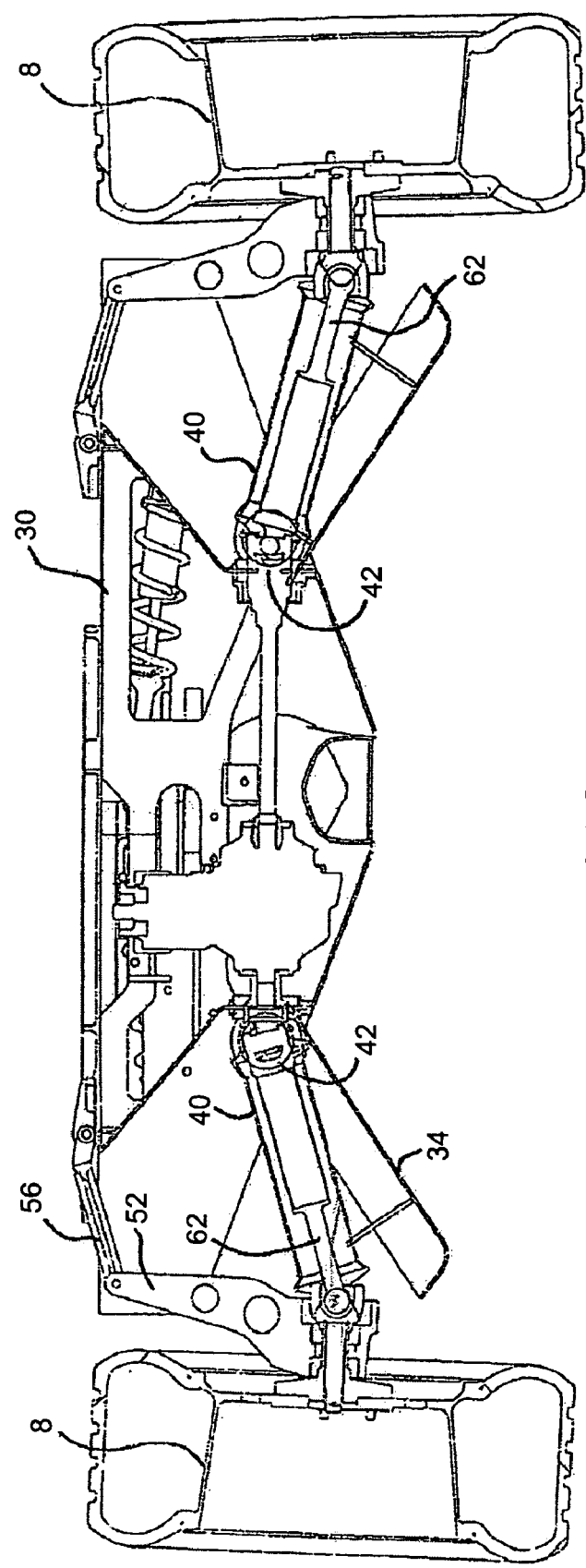
FIG. 3 is a further transverse cross section through plane II—II of FIG. 1 with the wheels down and protracted.

An advantage of a split hull/body construction as shown in FIG. 2 and in other figures is that the mechanical components can be built up on the hull, forming a chassis or platform; then the upper body is joined to the platform to produce a complete vehicle. In FIGS. 2 and 3, which only show the lower part of the vehicle, the platform is designated 30. At each side of the vehicle is a slot 32 extending upwards from planing hull surface 20. When the wheels 8 are retracted as shown in FIG. 2, each slot 32 is covered at the bottom by a cover 34, which is held in a closed position by brackets 36 and 38 extending downwardly from a suspension tube 40. Tube 40 is pivotally mounted inboard by means of bearings; one of which is shown as a circle 42 in FIG. 2; and which can be seen as 44 and 46 on FIG. 5. Seals (not shown) are appended to these bearings to keep the vehicle interior watertight. The vehicle interior may be divided into compartments (not shown).

Figure 4:
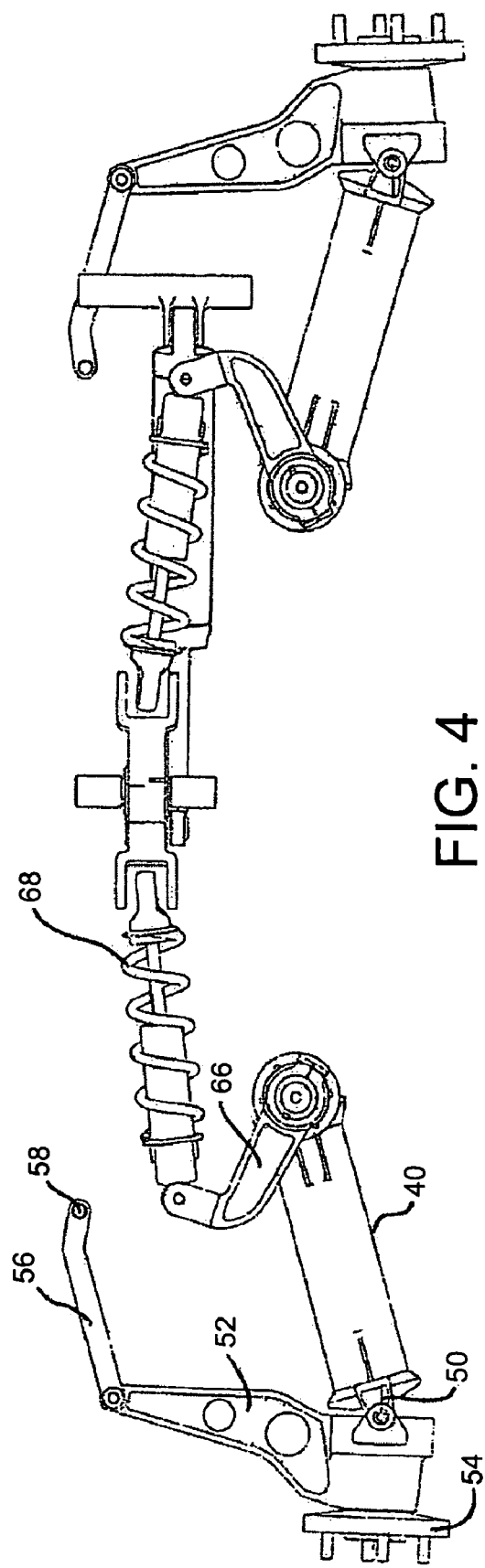
FIG. 4 is a transverse elevation of the suspension for the rear wheels of the vehicle of FIG. 1 with the wheels removed.
Figure 5:
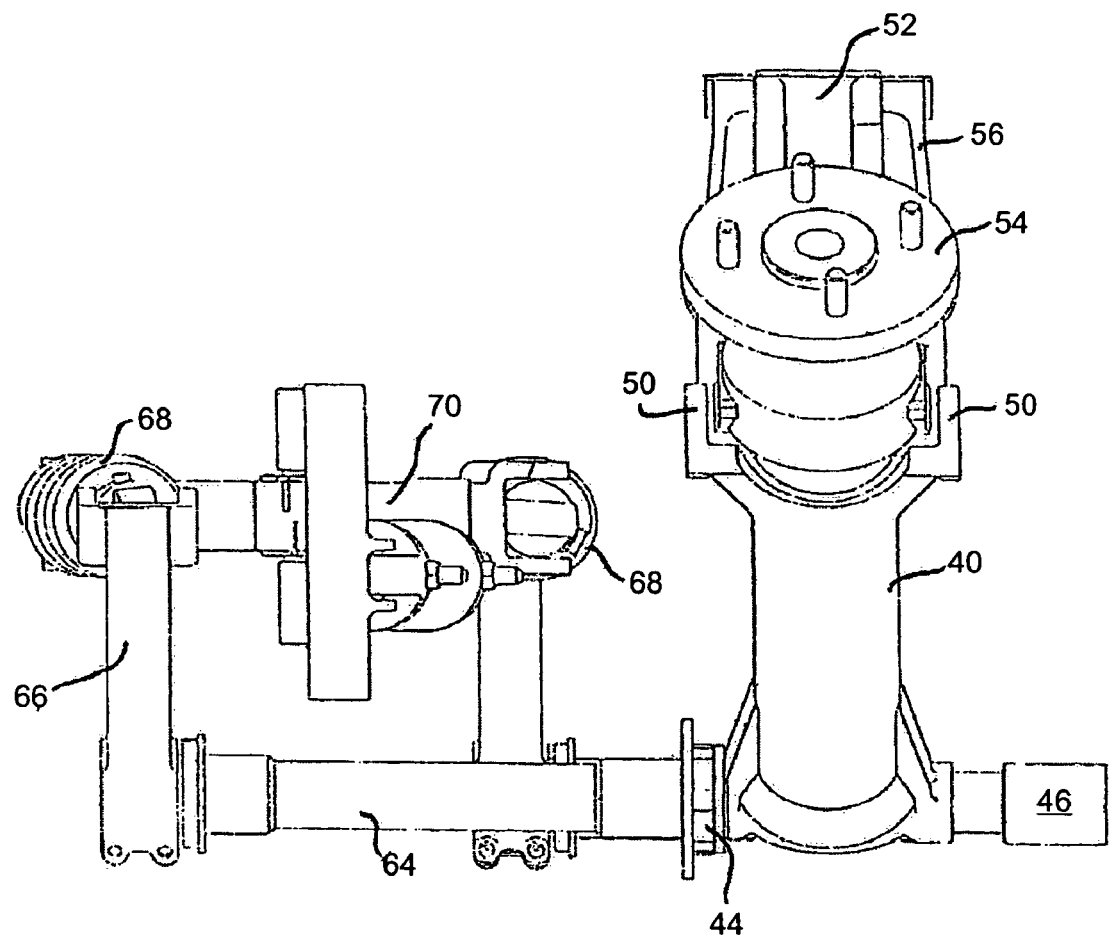
FIG. 5 is a side elevation of the parts of the suspension shown in FIG. 4, with the wheels retracted.
Figure 6:
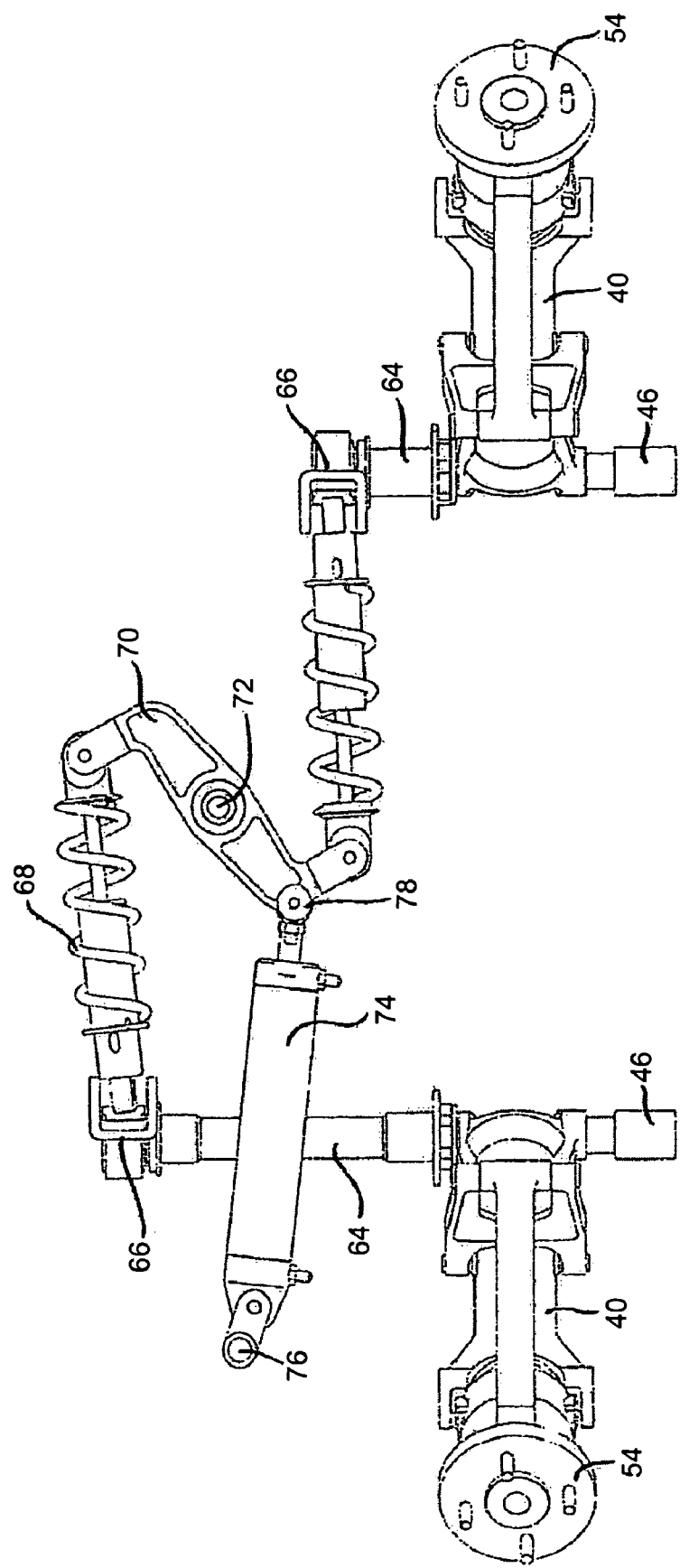
FIG. 6 is a plan view of the suspension for the rear wheels of the vehicle of FIG. 1 with the wheels retracted.
Figure 7:
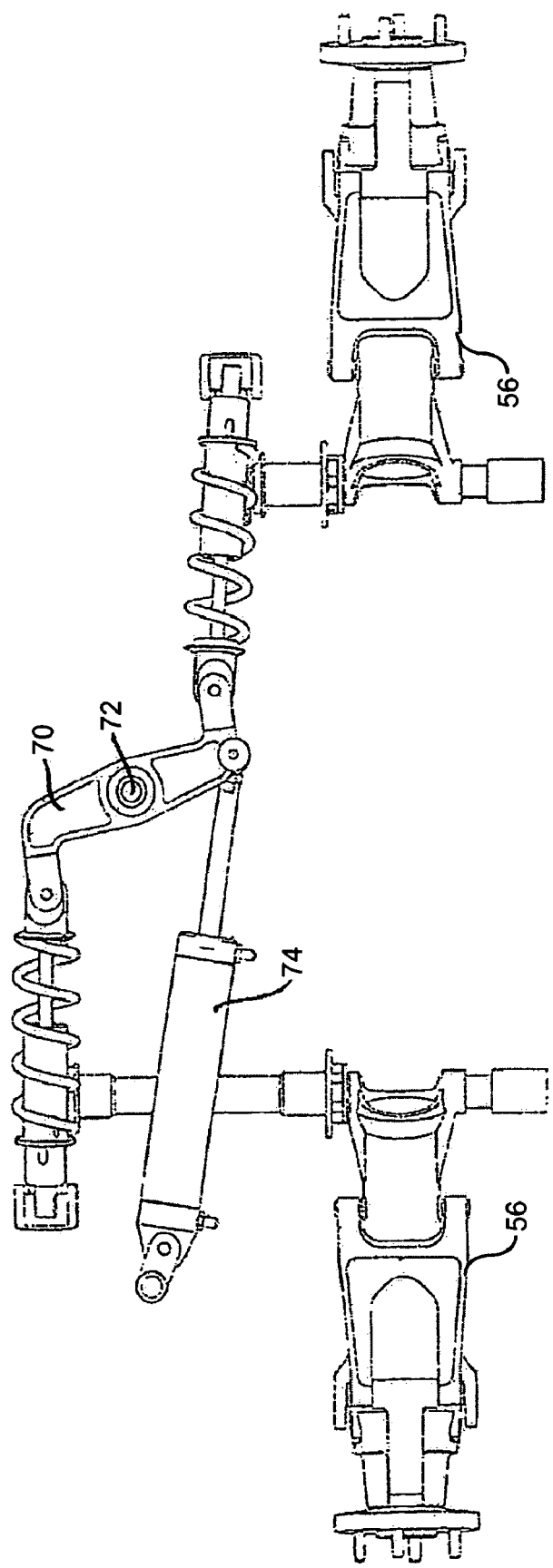
FIG. 7 is a plan view of the suspension for the rear wheels of the vehicle of FIG. 1 with the wheels down and protracted.

At the outer end of each tube 40 are brackets 50 (FIG. 4), which are pivotally connected to the lower end of an intermediate suspension member 52; which carries a bearing hub 54 to which wheel 8 is bolted. The axes about which the inboard end of tube 40 pivots and about which bracket 50 pivots are substantially parallel relative to one another. The intermediate suspension member 52 and bearing hub 54 together form a wheel hub assembly. Intermediate suspension member 52 at its upper end is attached pivotally to an upper suspension member or link 56, which is in turn pivotally mounted at 58 to platform 30. An outer or distal end of the tube 40 is pivotally connected to the wheel hub assembly, the tube forming a lower suspension member. The inner end of each tube 40 is fixed to a proximal end of a longitudinal shaft 64 (FIG. 5). The distal end of shaft 64 is fixed to a rotating arm 66, which is in turn fixed to a suspension unit 68 comprising a coil spring and a co-axial telescopic damper. Unit 68 is in turn fixed to a suspension retraction rocker arm 70 (FIGS. 6 and 7). Arm 70 is pivotally mounted to the vehicle platform at 72. Suspension retraction ram 74 is mounted to platform 30 at pivot 76, and is lengthened or shortened by pneumatic or hydraulic pressure to retract or protract the wheels, as can be seen from FIGS. 6 (retracted) and 7 (protracted). Vehicle 2 has a prime mover 4 driving road and marine transmissions. The power train includes primary shafts 60 which each drive an intermediate shaft 62, which connects to and drives hub 54. The intermediate shaft 62 extends within the tube 40 substantially co-axially with the tube 40.

The tube 40 will absorb loading on the wheel 8 which would otherwise have to be absorbed by the intermediate shaft 62. The tube 40 provides a lower suspension arm for the suspension. By arranging the shaft 62 in the tube 40 there needs to be only one aperture though the hull to accommodate both, which aperture can then be sealed by plate 34. The suspension will thus comprise the upper suspension arm 56, which is forked (see FIG. 7) at its inboard end so that it can resist fore and aft loads on the wheel 8; and a lower suspension arm in the form of the tube 40. As can be seen in FIG. 3, the centre line of the wheel 8 will be displaced vertically by some distance from the point of connection of the inboard end of the tube 40 to the shaft 64, thus lateral forces on the wheel 8 will develop a significant moment about the inboard end of the tube 40. This makes it very important for the tube 40 to resist loads, rather than the shaft 62; and in particular, rather than the articulating joints coupling the shaft 62 to the wheel 8 and to the primary shaft 60.

As may be seen particularly from FIGS. 2 and 3, the substantially horizontal alignment of spring and damper units 68 allows the retractable suspension to be neatly packaged below split line 18 (FIG. 1). This allows a low centre of gravity and metacentric height for good handling on both land and water. The springs and dampers are also packaged within the watertight interior of the vehicle, avoiding potential problems with corrosion and seizure of joints.

It will be appreciated that further modifications to the vehicle layout and systems may also be made as required without departing from the scope of the invention. In particular, it may be found convenient to use a lead screw driven by an electric motor to retract and protract the wheels. Suspension units 68 may be mounted vertically, or at an angle between vertical and horizontal, if this is found convenient for packaging purposes. Air spring suspension may be used; or hydraulic spring and damper units. The latter may be combined with suspension retraction means, as described in our co-pending patent application published as WO 01/74612.

The transmission of power from the prime mover to the wheels may comprise electric or hydraulic drive. Although the prime mover of the claims may be an internal combustion engine, it could be any other suitable driving means, for example an electric motor driven by electricity from a fuel cell. The vehicle structure may comprise an open frame, a monocoque, or any other enclosure.

Whilst above the member 40 is described as a closed tube, it could equally well be formed as a cage around the shaft 40 or as an arm or a plurality of arms which extend(s) substantially alongside the shaft (parallel to or substantially parallel to) the shaft 40, in close proximity thereto.

While a particular form of the present invention has been illustrated and described, it will also be apparent to those skilled in the art that various modifications can be made without departing from the spirit and the scope of the present invention. Accordingly, it is not intended that the invention be limited except by the appended claims.

What is claimed is:

1. An amphibious vehicle having a prime mover, seating arrangements, at least two road wheels and a hull defining a water-line, wherein two road wheels are each arranged to be driven from the prime mover at least by means of a primary shaft and an intermediate shaft between each wheel and each primary shaft, each intermediate shaft having an articulatable torque transmitting joint at each end so as to enable each driven wheel of the road wheels to be moved upwards from a lowered, ground engaging position to a raised position above the vehicle's water-line, wherein each said driven wheel is mounted rotatably to an intermediate suspension member, the intermediate suspension member being mounted to and between an upper suspension member and a lower suspension member, the lower suspension member being accommodated within a narrow recess in the hull of the vehicle when its driven wheel is in the raised position, characterised in that the intermediate shaft is encaged by a cage means mounted between the intermediate suspension member and the hull of the vehicle so as to resist torsional forces on the intermediate suspension member when the wheels are rotating or being braked.

2. An amphibious vehicle according to claim 1, where the cage means is a tube surrounding at least mainly the intermediate shaft.

3. An amphibious vehicle according to claim 1, wherein the cage means is the lower suspension member.

4. An amphibious vehicle according to claim 1, where the width of the recess in the hull is less in the longitudinal direction of the vehicle than the radius of the road wheel.

5. An amphibious vehicle according to claim 1, where the upper suspension member is a wishbone mounted pivotably to the body of the vehicle.

6. An amphibious vehicle according to claim 5, where the wishbone comprises two arms which are substantially parallel to each other.

7. An amphibious vehicle according to claim 1, where the hull is configured for planing.

8. An amphibious vehicle according to claim 1, where the torque transmitting joints are universal couplings.

9. An amphibious vehicle according to claim 8, where the universal couplings are constant velocity joints.

10. An amphibious vehicle according to claim 9, where the constant velocity joints are arranged with a fixed inner joint and a plunging outer joint.

11. An amphibious vehicle according to claim 1, where an axis of rotation of each road wheel is at least thirty degrees from the horizontal when the wheels are retracted.

12. An amphibious vehicle according to claim 11, where an axis of rotation of each road wheel is at least forty degrees from the horizontal when the wheels are retracted.

13. An amphibious vehicle according to claim 1, where spring and damper units for each road wheel are mounted so as to be linked to, but remote from, the upper and lower suspension members.

14. An amphibious vehicle according to claim 13, where the spring and damper units for each road wheel are mounted within a watertight interior compartment of the vehicle.

15. An amphibious vehicle according to claim 1, where an actuator for suspension retraction and protraction for the road wheels is mounted so as to be linked to, but remote from, the upper and lower suspension members.

16. An amphibious vehicle according to claim 15, where the suspension retraction and protraction means for the road wheels are mounted within a watertight interior compartment of the vehicle.

17. An amphibious vehicle according to claim 15, where the suspension retraction and protraction actuator is linked to a pivotal arm to either end of which are mounted springs and dampers.

18. An amphibious vehicle according to claim 1, where the seating arrangement is aligned along or parallel to a longitudinal axis of the vehicle.

19. An amphibious vehicle according to claim 1, where the prime mover is aligned along or parallel to a longitudinal axis of the vehicle.

20. An amphibious vehicle according to claim 1, where the cage means is sealed against ingress of water.

21. An amphibious vehicle comprising a prime mover, a seat, a hull or a plurality of road wheels, a transmission for relaying drive from the prime mover to at least one of the road wheels, a suspension arrangement connecting the road wheels to the remainder of the vehicle and a wheel retraction mechanism for retracting the road wheels from a lowered ground-engaging position for land use of the vehicle to a raised position for use of the vehicle on water, wherein for each driven wheel:
   a hub assembly is provided on which the driven wheel is rotatably supported;
   the suspension arrangement comprises an upper suspension arm connecting the driven wheel hub assembly to the remainder of the vehicle;
   the transmission comprises a first transmission shaft connected at a distal end by a first articulating joint to a wheel shaft connected to the wheel and at a proximal end, nearest a centre line of the vehicle, by a second articulating joint to a remainder of the transmission; and
   the suspension arrangement comprises a lower suspension arm which at least partially encompasses the first transmission shaft and which is pivotally connected at the distal end thereof to the driven wheel hub assembly; and
   a single elongated slot is provided in the hull through which both the lower suspension arm and the first shaft rotate when the driven wheel is retracted by the wheel retracting mechanism.

22. An amphibious vehicle as claimed in claim 21, wherein the lower suspension arm and the first transmission shaft rotate to their retracted positions through planes parallel or coincident with each other.

23. An amphibious vehicle as claimed in claim 21, wherein the lower suspension arm is connected at a proximal end, closest the vehicle centre line, to a suspension shaft to rotate therewith, the suspension shaft being connected to an inboard spring and damper assembly and to the wheel retraction mechanism.

24. An amphibious vehicle as claimed in claim 21, wherein the lower suspension arm encases the first shaft.

25. An amphibious vehicle as claimed in claim 24, wherein the lower suspension arm is tubular.

26. An amphibious vehicle as claimed in claim 21, wherein the slot is formed as a recess in the hull.

27. An amphibious vehicle as claimed in claim 21, wherein a cover is attached to the lower suspension arm which moves with the lower suspension arm and covers the slot when the suspension arm is retracted.

28. An amphibious vehicle comprising a primer mover, a seat, a hull, a plurality of road wheels, a transmission for connecting at least one of the road wheels to the prime mover to be driven thereby, a suspension arrangement connecting the road wheels to a remainder of the vehicle and a wheel retraction mechanism for retracting the road wheels from a lowered ground engaging position for land use of the vehicle to a raised position for use of the vehicle on water, wherein for each driven wheel:
   a hub assembly is provided on which the driven wheel is rotatably mounted;
   the suspension arrangement comprises an upper suspension arm connecting the driven wheel hub assembly to the remainder of the vehicle;
   the transmission comprises a first transmission shaft connected at a distal end by a first articulating joint to a wheel shaft via which driven wheel is driven to rotate and connected at a proximal end, nearest a vehicle centre line, by a second articulating joint to a second transmission shaft via which the first transmission shaft is connected to the prime mover; and
   the suspension arrangement comprises a lower suspension arm pivotally connected at a distal end to the driven wheel hub assembly and connected at a proximal end, nearest the vehicle centre line, to a suspension shaft to rotate therewith, the suspension shaft being connected to an inboard spring and damper assembly and to the wheel retraction assembly and the lower suspension arm extending alongside the first transmission shaft.

29. An amphibious vehicle as claimed in claim 28, wherein the lower suspension arm and the first transmission shaft rotate to their retracted positions through planes coincident or parallel with each other.

30. An amphibious vehicle as claimed in claim 28, wherein the lower suspension arm at the proximal end thereof is connected to the suspension shaft for rotation about an axis coincident with or parallel to an axis of rotation of the first transmission shaft which is provided by the articulating joint at the proximal end of the first transmission shaft.

31. An amphibious vehicle as claimed in claim 28, wherein the first transmission shaft and the lower suspension arm rotate together into a common slot in the vehicle hull when rotated to the retracted positions thereof by the wheel retraction mechanism.

32. A retracting wheel suspension for an amphibious vehicle, comprising:
   a hub carrier for rotatably supporting a wheel about an axis of rotation for locomotion of said vehicle, said hub carrier being supported by at least two suspension links;
   a lower suspension link, pivotally attached to said vehicle at its inboard end and pivotally attached to said hub carrier at its outboard end such that said hub carrier pivots about an axis that is perpendicular to said axis of rotation, wherein said lower suspension link further comprises a tube substantially concentrically aligned with an axis extending between said inboard and outboard attachments;
   an upper suspension link pivotally attached to said vehicle at its inboard end and pivotally attached to said hub carrier at its outboard end above said axis of rotation.

33. The retracting wheel suspension of claim 32, wherein an intermediate drive shaft for transferring power from said vehicle to said wheel is disposed within said lower suspension link.

34. The retracting wheel suspension of claim 32, wherein said tube has a circular cross-section.

35. The retracting wheel suspension of claim 32, wherein said lower suspension link is pivotally attached to said vehicle by at least one shaft extending from said inboard end of said link that is rotatably supported by said vehicle.

36. The retracting wheel suspension of claim 35, wherein said at least one shaft is rotationally biased.

37. The retracting wheel suspension of claim 36, further comprising:
   a lever arm radially extending from said one shaft;
   a shiftable anchor point; and
   a compression spring configured and oriented so as to bias said lever arm relative to said anchor point, whereby said anchor point is shiftable between preselected positions that correspond to retracted or protracted orientations of said wheel.

38. The retracting wheel suspension of claim 37, further comprising:
   a rocker arm rotatably mounted to said vehicle and defining said anchor point along its length such that rotation of said rocker arm causes said anchor point to shift; and
   a ram for rotating said rocker arm to preselected positions.

39. The retracting wheel suspension of claim 38, wherein said rocker arm defines a second anchor point and wherein rotation of said rocker arm causes a second wheel to simultaneously assume a similarly retracted or protracted orientation.

40. The retracting wheel suspension of claim 37, wherein said lever arm, compression spring, rocker arm and ram are positioned with a watertight compartment of said vehicle.

41. The retracting wheel suspension of claim 32, wherein said lower suspension link has a watertight interior.

42. A retracting wheel suspension for an amphibious vehicle, said vehicle having a watertight hull, comprising:
   a laterally extending tubular lower suspension link, having an inboard end and an outboard end, its inboard end having at least one fore and aft extending support shaft affixed to its inboard end, said shaft being rotatably supported by said hull in a watertight manner;
   a hub carrier for rotatably supporting a wheel about an axis of rotation supported by the outboard end of said tube-shaped suspension link such that said hub carrier is pivotable about an axis that is perpendicular to said axis of rotation; and an upper suspension link pivotally attached to said hub carrier above said axis of rotation for controlling the pivot angle of said hub carrier relative to said lower suspension link.

43. The retracting wheel suspension of claim 42, wherein an intermediate drive shaft for transferring power from said vehicle to said wheel is disposed within said tube-shaped lower suspension link.

44. The retracting wheel suspension of claim 43, further comprising a primary drive shaft for transferring power from said vehicle to said intermediate drive shaft, wherein said primary drive shaft extends through said hull in a watertight manner.

45. The retracting wheel suspension of claim 43, wherein said tube-shaped lower suspension link has a watertight interior.

46. The retracting wheel suspension of claim 42, wherein said tube-shaped lower suspension link has a circular cross-section.

47. The retracting wheel suspension of claim 42, wherein one of said support shafts is rotationally biased from within the water tight hull.

48. The retracting wheel suspension of claim 47, wherein said rotational bias is achieved by a coil spring.

49. The retracting wheel suspension of claim 48, wherein said coil spring is coaxially disposed about a damper.

50. The retracting wheel suspension of claim 49, wherein said coil spring and damper are fixed to a suspension retraction rocker arm, the rotation of which causes said wheel to move between a protracted and retracted orientation.

51. The retracting wheel suspension of claim 50, wherein rotation of said rocker arm simultaneously causes a second wheel to move between a similarly protracted and retracted orientation.

* * * * *

UNITED STATES PATENT AND TRADEMARK OFFICE
CERTIFICATE OF CORRECTION

PATENT NO. : 7,234,982 B2 Page 1 of 1
APPLICATION NO. : 11/256205
DATED : June 26, 2007
INVENTOR(S) : Simon James Longdill et al.

It is certified that error appears in the above-identified patent and that said Letters Patent is hereby corrected as shown below:

<u>Title Page, Item (30)</u>, Foreign Application Priority Data, delete "Dec. 22, 2004" and insert --Oct. 22, 2004--.

Signed and Sealed this

Sixth Day of November, 2007

JON W. DUDAS
*Director of the United States Patent and Trademark Office*